US012712549B2

(12) United States Patent
Houssameddine et al.

(10) Patent No.: US 12,712,549 B2
(45) Date of Patent: Aug. 18, 2026

(54) SYSTEMS AND METHODS FOR CONFIGURATION OF A CONFIGURATION BIT WITH A VALUE

(71) Applicant: Everspin Technologies, Inc., Chandler, AZ (US)

(72) Inventors: Dimitri Houssameddine, Sunnyvale, CA (US); Syed M. Alam, Austin, TX (US); Sanjeev Aggarwal, Scottsdale, AZ (US)

(73) Assignee: Everspin Technologies, Inc., Chandler, AZ (US)

( * ) Notice: Subject to any disclaimer, the term of this patent is extended or adjusted under 35 U.S.C. 154(b) by 0 days.

(21) Appl. No.: 19/197,179

(22) Filed: May 2, 2025

(65) Prior Publication Data

US 2025/0266840 A1 Aug. 21, 2025

Related U.S. Application Data

(63) Continuation of application No. 18/362,704, filed on Jul. 31, 2023, now Pat. No. 12,328,121, which is a (Continued)

(51) Int. Cl.
*H03K 19/1776* (2020.01)
*G11C 11/16* (2006.01)
(Continued)

(52) U.S. Cl.
CPC ...... *H03K 19/1776* (2013.01); *G11C 11/1675* (2013.01); *G11C 13/0069* (2013.01); (Continued)

(58) Field of Classification Search
None
See application file for complete search history.

(56) References Cited

U.S. PATENT DOCUMENTS 9,336,849 B2 5/2016 Alam et al.
9,336,872 B2 * 5/2016 Andre .................. G11C 13/004
(Continued)

FOREIGN PATENT DOCUMENTS

CN 106059567 A 10/2016
CN 110532222 A 12/2019

OTHER PUBLICATIONS

European search report in corresponding European Application No. 22167167.0, dated Oct. 4, 2022 (18 pages).
(Continued)

*Primary Examiner* — Anh Q Tran
(74) *Attorney, Agent, or Firm* — Bookoff McAndrews, PLLC

(57) ABSTRACT

The present disclosure is drawn to, among other things, a configuration bit including at least four resistive elements and a voltage amplifier. At least two first resistive elements may be electrically connected in series via a first electrode and at least two second resistive elements may be electrically connected in series via a second electrode. The at least two first resistive elements may be electrically connected in parallel to the at least two second resistive elements via a third electrode and a fourth electrode. The first electrode and the second electrode may be electrically connected to a voltage supply. The third electrode and the fourth electrode may be electrically connected to an input of the voltage amplifier.

20 Claims, 13 Drawing Sheets

Related U.S. Application Data continuation of application No. 17/652,905, filed on Feb. 28, 2022, now Pat. No. 11,757,451.

(60) Provisional application No. 63/224,637, filed on Jul. 22, 2021.

(51) Int. Cl.

| | |
|---|---|
| ***G11C 13/00*** | (2006.01) |
| ***H03K 19/17724*** | (2020.01) |
| ***H03K 19/17784*** | (2020.01) |
| *G06F 21/78* | (2013.01) |

(52) U.S. Cl.

CPC . *H03K 19/17724* (2013.01); *H03K 19/17784* (2013.01); *G06F 21/78* (2013.01)

(56) References Cited

U.S. PATENT DOCUMENTS

| | | | |
|---|---|---|---|
| 9,530,476 | B2 | 12/2016 | Alam et al. |
| 9,697,879 | B2 | 7/2017 | Alam et al. |
| 9,754,652 | B2 | 9/2017 | Andre |
| 9,973,194 | B2 | 5/2018 | Tate et al. |
| 10,411,711 | B2 | 9/2019 | Kozaczuk et al. |
| 11,757,451 | B2 | 9/2023 | Houssameddine et al. |
| 12,328,121 | B2 | 6/2025 | Houssameddine et al. |
| 2006/0017488 | A1 | 1/2006 | Hsu |
| 2006/0220724 | A1* | 10/2006 | Teng Hsu .......... G11C 13/0004 327/308 |
| 2016/0254041 | A1 | 9/2016 | Andre |
| 2016/0293240 | A1* | 10/2016 | Fukuzawa ........... G11C 11/1675 |
| 2017/0154924 | A1 | 6/2017 | Johnson |

OTHER PUBLICATIONS

Yang Changju et al: "On Learning With Nonlinear Memristor-Based Neural Network and its Replication", IEEE Transactions on Circuits and Systems I: Regular Papers, IEEE, US, vol. 66, No. 10, Oct. 1, 2019 (Oct. 1, 2019), pp. 3906-3916, XP011748025, ISSN: 1549-8328, DOI: 10.1109/TCSI.2019.2914125 (11 pages).

Yang Jiu et al: "A novel memristive Hopfield neural network with application in associative memory", Neurocomputing, Elsevier, Amsterdam, NL, vol. 227, Nov. 16, 2016 (Nov. 16, 2016), pp. 142-148, XP029886461, ISSN: 0925-2312, DOI: 10.1016/J.NEUCOM.2016.07.065 (7 pages).

* cited by examiner

SYSTEMS AND METHODS FOR CONFIGURATION OF A CONFIGURATION BIT WITH A VALUE

CROSS-REFERENCE TO RELATED APPLICATION

This application claims benefit to U.S. patent application Ser. No. 18/362,704, filed Jul. 31, 2023, which claims benefit to U.S. patent application Ser. No. 17/652,905, filed Feb. 28, 2022 (now U.S. Pat. No. 11,757,451), which claims benefit to U.S. Provisional Patent Application No. 63/224,637, filed Jul. 22, 2021, the entire contents of which are incorporated herein by reference.

TECHNICAL FIELD

Embodiments of the present disclosure relate to, among other things, a configuration bit. More specifically, certain embodiments of the present disclosure relate to configuration of a configuration bit with a value.

INTRODUCTION

In a field-programmable gate array (FPGA), configuration bits may be scattered throughout the device, and the information provided by these bits may control the function of the FPGA. However, there may be performance, security, and/or scaling issues with conventional implementations of configuration bits. For example, static random-access memory (SRAM) (volatile memory) may be used to load the configuration bits into the FPGA upon start up from external non-volatile memory. However, this raises security concerns as the information for all of the configuration bits may be centrally stored in the non-volatile memory. In addition, use of external memory for non-volatile storage may expose the information for the configuration bits to disruption by external radiation, may cause slower boot time for the FPGA compared to having the non-volatile storage in the FPGA, and/or may need a significant amount of peripheral analog circuitry for reading or writing.

Some conventional implementations of configuration bit storage may use non-volatile storage in the FPGA (e.g., may use Flash memory for the configuration bits rather than SRAM). However, conventional implementations of non-volatile memory in an FPGA may involve a significant amount of additional circuitry in the FPGA, which may prevent use of these conventional implementations with smaller scale technologies. For example, Flash memory may not be scalable to nodes under 28 nanometers (nm). Thus, there may be a need for non-volatile memory in an FPGA (or similar integrated circuit) that is scalable to small-scale technologies.

The present disclosure relates to configuration bits (e.g., memory devices, such as magnetoresistive random-access memory (MRAM) or resistive random-access memory (ReRAM)) in a small scale integrated circuit (e.g., a small-scale FPGA) and methods for configuring a configuration bit with a value. The scope of the current disclosure, however, is defined by the attached claims, and not by any characteristics of the resulting devices or methods.

BRIEF DESCRIPTION OF THE DRAWINGS

In the course of the detailed description that follows, reference will be made to the appended drawings. The drawings show different aspects of the present disclosure and, where appropriate, reference numerals illustrating like structures, components, materials, and/or elements in different figures are labeled similarly. It is understood that various combinations of the structures, components, and/or elements, other than those specifically shown, are contemplated and are within the scope of the present disclosure.

Moreover, there are many embodiments of the present disclosure described and illustrated herein. The present disclosure is neither limited to any single aspect nor embodiment thereof, nor to any combinations and/or permutations of such aspects and/or embodiments. Moreover, each of the aspects of the present disclosure, and/or embodiments thereof, may be employed alone or in combination with one or more of the other aspects of the present disclosure and/or embodiments thereof. For the sake of brevity, certain permutations and combinations are not discussed and/or illustrated separately herein; however, all permutations and combinations are considered to fall within the scope of the present inventions.

Figure 1B:
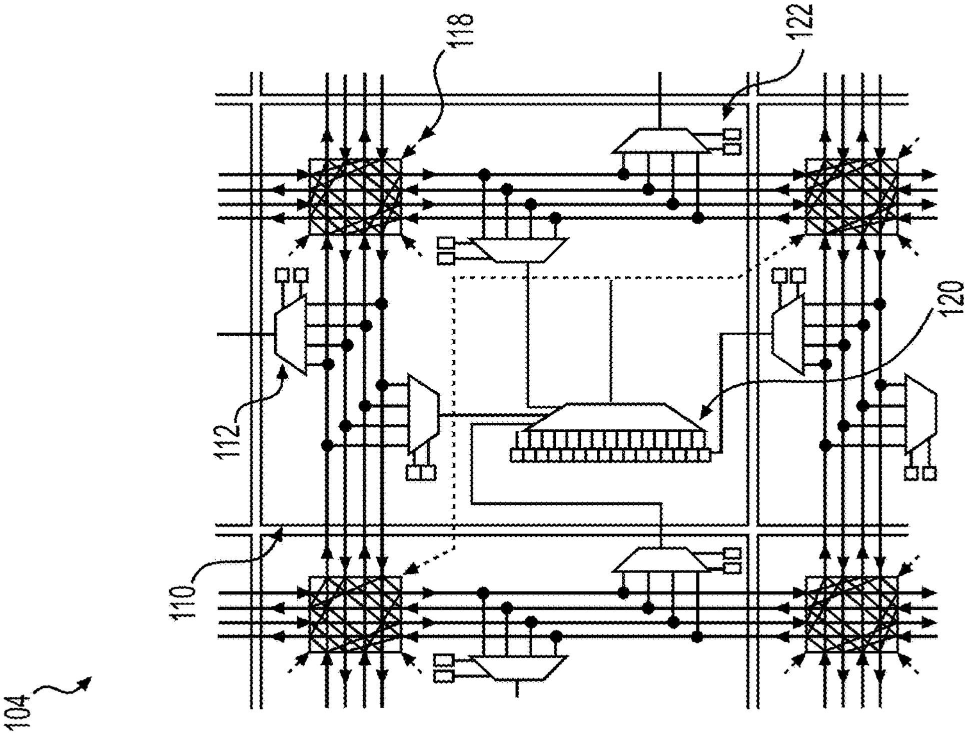
FIG. 1B depicts an exemplary configurable logic block of the FPGA architecture of FIG. 1A, according to an aspect of the present disclosure.

Again, there are many embodiments described and illustrated herein. The present disclosure is neither limited to any single aspect nor embodiment thereof, nor to any combinations and/or permutations of such aspects and/or embodiments. Each of the aspects of the present disclosure, and/or embodiments thereof, may be employed alone or in combination with one or more of the other aspects of the present disclosure and/or embodiments thereof. For the sake of brevity, many of those combinations and permutations are not discussed separately herein.

As used herein, the terms "comprises," "comprising," or any other variation thereof, are intended to cover a non-exclusive inclusion, such that a process, method, article, or apparatus that comprises a list of elements does not include only those elements, but may include other elements not expressly listed or inherent to such process, method, article, or apparatus. The term "exemplary" is used in the sense of "example," rather than "ideal."

DETAILED DESCRIPTION

Detailed illustrative aspects are disclosed herein. However, specific structural and functional details disclosed herein are merely representative for purposes of describing example embodiments of the present disclosure. The present disclosure may be embodied in many alternate forms and should not be construed as limited to only the embodiments set forth herein. Further, the terminology used herein is for the purpose of describing particular embodiments only and is not intended to be limiting of exemplary embodiments described herein.

When the specification makes reference to "one embodiment" or to "an embodiment," it is intended to mean that a particular feature, structure, characteristic, or function described in connection with the embodiment being discussed is included in at least one contemplated embodiment of the present disclosure. Thus, the appearance of the phrases, "in one embodiment" or "in an embodiment," in different places in the specification does not constitute a plurality of references to a single embodiment of the present disclosure.

As used herein, the singular forms "a," "an," and "the" are intended to include the plural forms as well, unless the context clearly indicates otherwise. It also should be noted that in some alternative implementations, the features and/or steps described may occur out of the order depicted in the figures or discussed herein. For example, two steps or figures shown in succession may instead be executed substantially concurrently or may sometimes be executed in the reverse order, depending upon the functionality/acts involved. In some aspects, one or more described features or steps may be omitted altogether, or may be performed with an intermediate step therebetween, without departing from the scope of the embodiments described herein, depending upon the functionality/acts involved.

Further, the terms "first," "second," and the like, herein do not denote any order, quantity, or importance, but rather are used to distinguish one element from another. Similarly, terms of relative orientation, such as "top," "bottom," etc. are used with reference to the orientation of the structure illustrated in the figures being described. It should also be noted that all numeric values disclosed herein may have a variation of ±10% (unless a different variation is specified) from the disclosed numeric value. Further, all relative terms such as "about," "substantially," "approximately," etc. are used to indicate a possible variation of ±10% (unless noted otherwise or another variation is specified).

In one aspect, the present disclosure is directed to techniques and implementations to program storage devices, including, e.g., non-volatile or "permanent" memory capable of maintaining data when a power supply is deactivated (e.g., Flash, MRAMs, or ReRAMs). Though the description below makes reference to MRAMs or ReRAMs memory device cell, the inventions may be implemented in other memory devices including, but not limited to, electrically erasable programmable read-only memory (EEPROM), and/or ferroelectric random-access memory (FRAM).

Figure 1A:
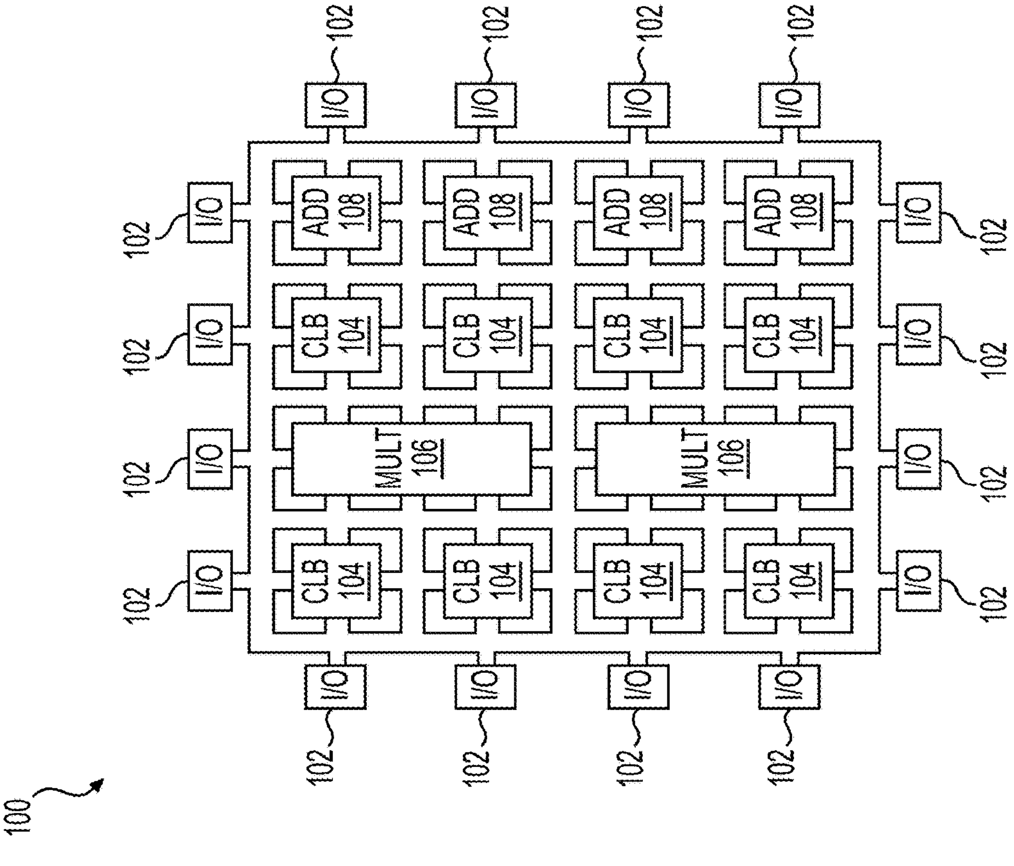
FIG. 1A depicts an exemplary FPGA architecture, according to an aspect of the present disclosure.

With reference now to FIG. 1A, there is depicted an exemplary FPGA architecture 100, according to an aspect of the present disclosure. As illustrated, the FPGA architecture 100 may include one or more input/output (I/O) components 102, which may electrically connect the FPGA architecture 100 with peripheral circuitry and/or components external to the FPGA architecture 100. In addition, the FPGA architecture 100 may include one or more configurable logic blocks (CLBs) 104. A CLB 104 may include circuitry configured to perform various logical operations of the FPGA architecture 100, such as logic functions, storage functions, and/or the like. The FPGA architecture 100 may further include one or more multiplexers 106. A multiplexer 106 may include circuitry configured to select between multiple input signals (analog or digital signals) and output the selected input signal. Furthermore, the FPGA architecture 100 may include one or more adders 108. An adder 108 may include circuitry configured to receive and add multiple signals together and output the added signal. Additionally, or alternatively, the FPGA architecture 100 may include one or more subtraction components to subtract one signal from another signal. The FPGA architecture 100 may include one or more other components not illustrated in, or described with respect to, FIG. 1A.

With reference now to FIG. 1B, there is depicted an exemplary CLB 104 of the FPGA architecture 100 of FIG. 1A, according to an aspect of the present disclosure. The CLB 104 may include one or more logic tiles 110. A logic tile 110 may include programmable circuitry to perform one or more logical operations of the FPGA architecture 100. A logic tile 110 may further include a multiplexer 112 similar to the multiplexer 106. However, the multiplexer 112 may be configured for particular operations of the logic tile 110. In addition, the logic tile 110 may include one or more switch boxes 118. A switch box 118 may include circuitry configured to electrically connect various components of the logic tile 110 to each other. Furthermore, the logic tile 110 may include one or more look-up tables 120, which may include circuitry that stores and outputs predefined signals for one or more combinations of input signals.

The logic tile 110 may additionally include one or more configuration bits 122. In aggregation, the configuration bits 122 for a logic tile 110 may control operations of the logic tile 110 and/or the FPGA architecture 100. The CLB 104 may include one or more other components not illustrated, or described in, FIG. 1B.

Figure 2A:
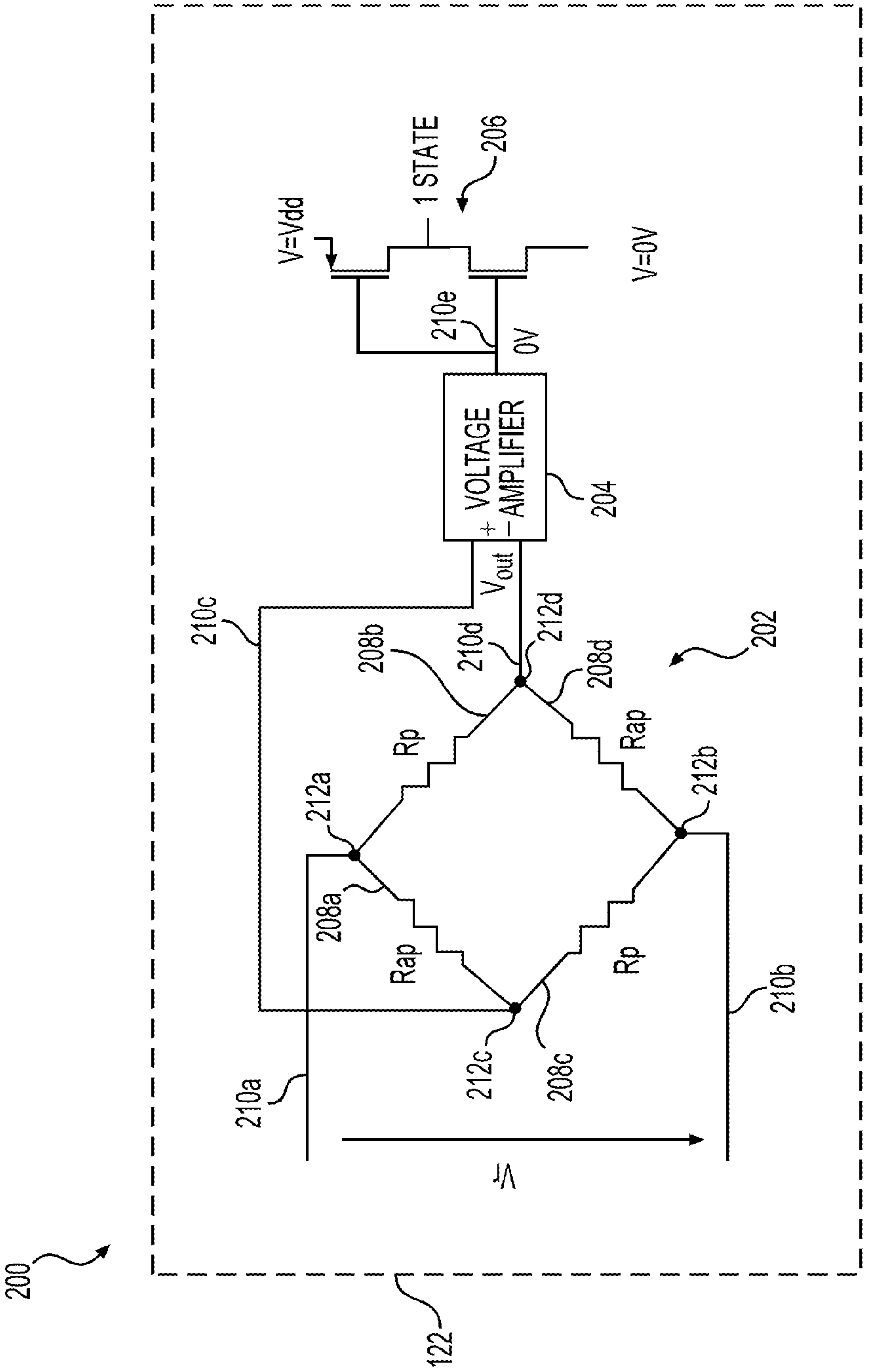
FIG. 2A depicts exemplary circuitry of a multi-time programmable configuration bit configured for read-out of a first value, according to an exemplary embodiment of the disclosure.

FIG. 2A depicts exemplary circuitry 200 of a multi-time programmable configuration bit 122 configured for read-out of a first value, according to an exemplary embodiment of the disclosure. For example, the configuration bit 122 may be a MRAM (e.g., toggle MRAM or spin-transfer torque (STT) MRAM) or a ReRAM that can be re-programmed multiple times to represent different values. The circuitry of the configuration bit 122 illustrated in FIG. 2A may read out a first value (e.g., 0 value of a binary 0 and 1 system).

As illustrated, the configuration bit 122 may include a magnetic tunnel junction (MTJ) bridge 202, a voltage amplifier 204, and an inverter 206. The MTJ bridge 202 may include one or more resistive elements 208 (e.g., resistive elements 208*a*, 208*b*, 208*c*, and 208*d*). Although FIG. 2A illustrates the MTJ bridge 202 as including four resistive elements 208, certain embodiments may include any number of multiple resistive elements 208 greater than four (e.g., 5, 6, 7, 8, etc. resistive elements). A resistive element 208 may include an MTJ or another type of electrical component capable of providing resistance to a flow of electrical current. For example, a resistive element 208 may have multiple resistance states (e.g., a low resistance state (parallel), Rp, and a high resistance state (antiparallel), Rap).

The MTJ bridge 202 may further include one or more electrodes 212 (e.g., electrodes 212*a*, 212*b*, 212*c*, and 212*d*) to electrically connect different resistive elements 208 in series or in parallel. For example, the resistive elements 208*a*, 208*b* (forming a first group of resistive elements 208) may be electrically connected in series via the electrode 212*a*, the resistive elements 208*c*, 208*d* (forming a second group of resistive elements 208) may be electrically connected in series via the electrode 212*b*, and the first group and second group of resistive elements may be electrically connected in parallel via the electrodes 212*c*, 212*d*.

As further illustrated in FIG. 2A, the configuration bit 122 may include one or more electrical connections 210 (e.g., electrical connections 210*a*, 210*b*, 210*c*, 210*d*, and 210*e*). The electrical connection 210*a* may electrically connect the electrode 212*a* to a voltage supply (not illustrated in FIG. 2A) and the electrical connection 210*b* may electrically connect the electrode 212*b* to the voltage supply. The electrical connection 210*c* may electrically connect the electrode 212*c* to an input of the voltage amplifier 204 and the electrical connection 210*d* may electrically connect the electrode 212*d* to the input of the voltage amplifier 204. The electrical connection 210*e* may electrically connect an output of the voltage amplifier to the inverter 206.

The inverter 206 may be in different states depending on whether the gate of the inverter 206 is open or closed. The inverter 206 may be in a first state (e.g., a 1 state) indicative of a first value (e.g., a 1 value) based on applied voltage to the MTJ bridge 202. In this example, the inverter 206 is illustrated with an n-type metal-oxide-semiconductor (NMOS) transistor and a p-type metal-oxide-semiconductor (PMOS) transistor connected in series. For example, FIG. 2A illustrates that a positive read voltage (Vr) may be input to the electrodes 212*a*, 212*b* from the voltage supply and a negative voltage (Vout) may be output from the electrodes 212*c*, 212*d* to the voltage amplifier 204. The voltage output (Vout) from the MTJ bridge 202 may be amplified by the voltage amplifier 204. For example, in FIG. 2A, the Vout from the MTJ bridge 202 may drive the output of the voltage amplifier to 0V. The voltage amplifier 204 may be in a latch stage to sense and hold a programmed state after a read is complete, and no sensing bias may be needed for this.

As described above, the resistive elements 208 may have two resistance states (e.g., a high resistance state, Rap, and a low resistance state, Rp). For the first state of the inverter 206, the resistive elements 208*a*, 208*d* may be in the high resistance state and the resistive elements 208*b*, 208*c* may be in the low resistance state.

Figure 2B:
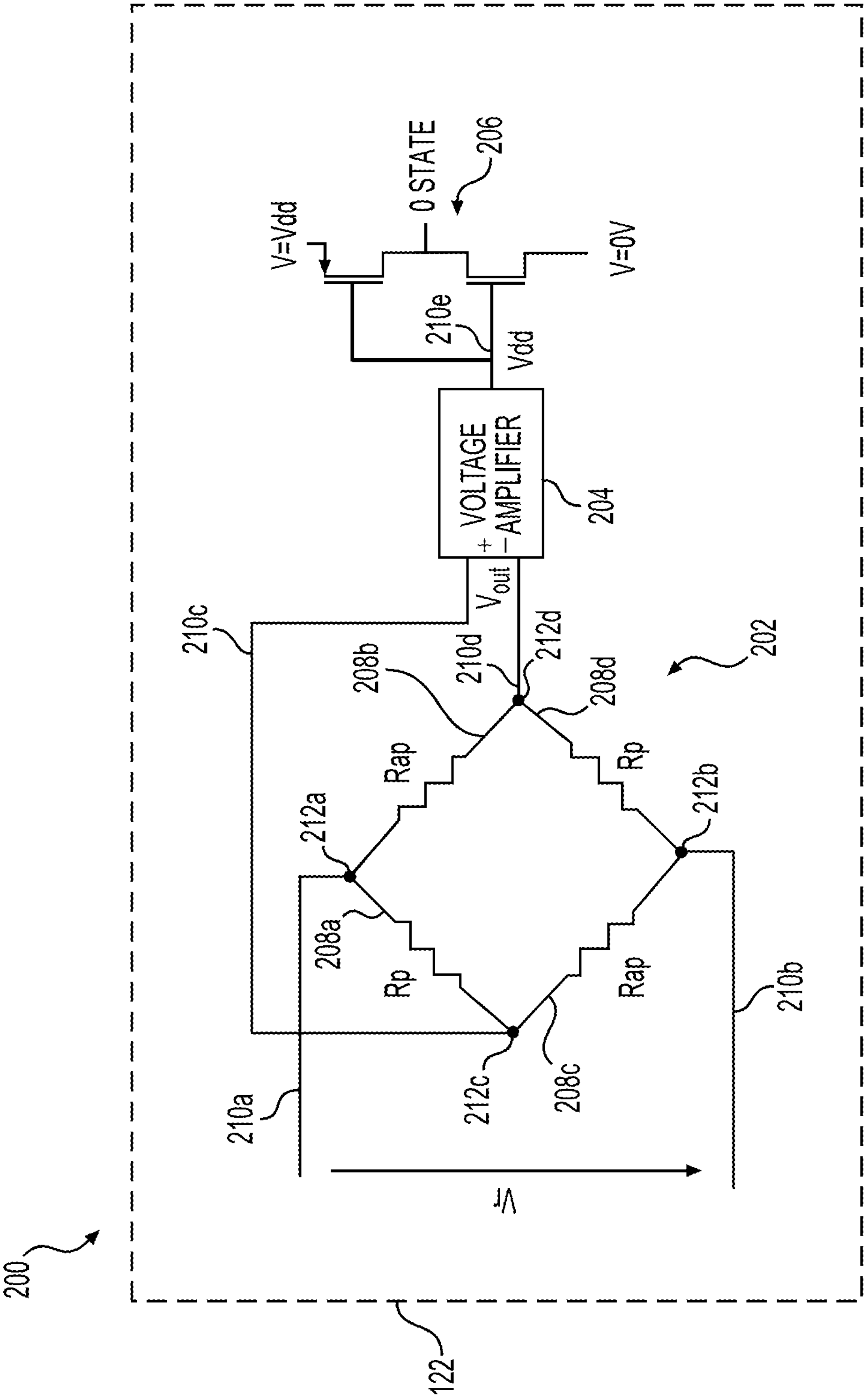
FIG. 2B depicts exemplary circuitry of a multi-time programmable configuration bit configured for read-out of a second value, according to an exemplary embodiment of the disclosure.

Referring to FIG. 2B, there is depicted exemplary circuitry 200 of a multi-time programmable configuration bit 122 configured for read-out of a second value, according to an exemplary embodiment of the disclosure. In FIG. 2B, the inverter 206 may be in a second state (e.g., a 0 state) indicative of a second value (e.g., a 0 value) based on applied voltage to the MTJ bridge 202. In this example, the inverter 206 is illustrated with an NMOS transistor and a PMOS transistor connected in series. For example, FIG. 2B illustrates that a positive Vr may be input to the electrodes 212*a*, 212*b* from the voltage supply and a positive voltage (Vout) may be output from the electrodes 212*c*, 212*d* to the voltage amplifier 204. The Vout from the MTJ bridge 202 may be amplified by the voltage amplifier 204. For example, in the example of FIG. 2B, the Vout from the MTJ bridge 202 may drive the output of the voltage amplifier to the positive drain voltage (Vdd). For the second state of the inverter 206, the resistive elements 208*b*, 208*c* may be in the high resistance state described elsewhere herein and the resistive elements 208*a*, 208*d* may be in the low resistance state described elsewhere herein.

Figure 3A:
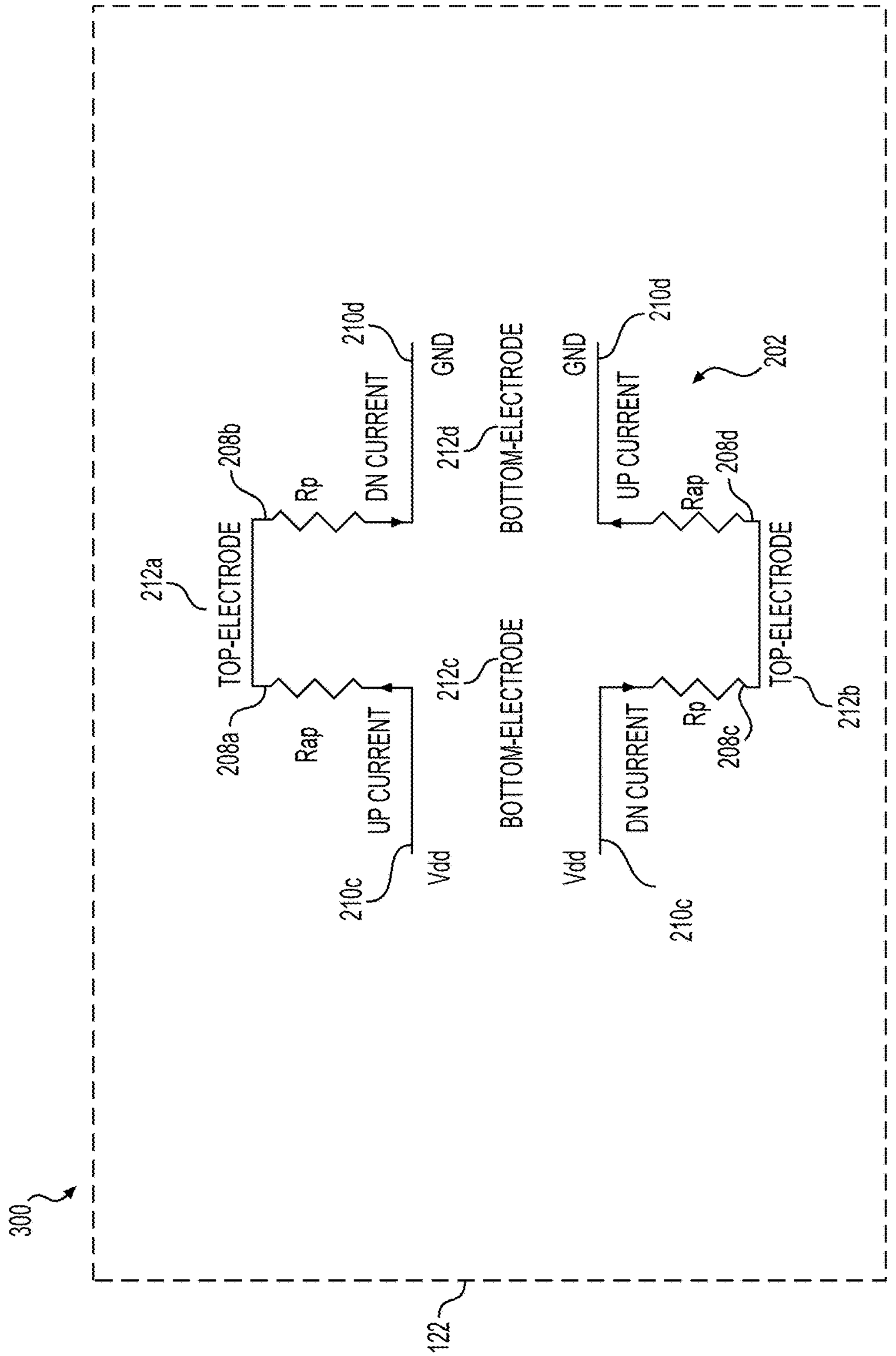
FIG. 3A depicts exemplary circuitry of a multi-time programmable configuration bit configured for writing of a first value, according to an exemplary embodiment of the disclosure.

FIG. 3A depicts exemplary circuitry 300 of a multi-time programmable configuration bit 122 configured for writing of a first value, according to an exemplary embodiment of the disclosure. The circuitry 300 may include an MTJ bridge 202, a voltage amplifier 204, an inverter 206, resistive elements 208, electrical connections 210, and electrodes 212 (some of which are not illustrated in FIG. 3A for explanatory purposes) configured in a manner similar to the circuitry 200 illustrated in FIG. 2A.

An inverter 206 (not illustrated in FIG. 3A) may be in a first state (e.g., a 0 state) indicative of a first value (e.g., a 0 value) based on a positive Vdd applied to the electrode 212*c* (e.g., a first bottom electrode) and a ground voltage (GND) applied to the electrode 212*d* (e.g., a second bottom electrode). In this state, based on applying the Vdd and the GND, current may flow from the electrode 212*c* up through the resistive element 208*a* and down through the resistive element 208*c*, through the electrodes 212*a*, 212*b* (e.g., top-electrodes), and down through the resistive element 208*b* and up through the resistive element 208*d* to the electrode 212*d*. The positive Vdd applied to the electrode 212*c* may be higher than a switching voltage for a resistive element, and lower than a breakdown voltage for the resistive element.

Figure 3B:
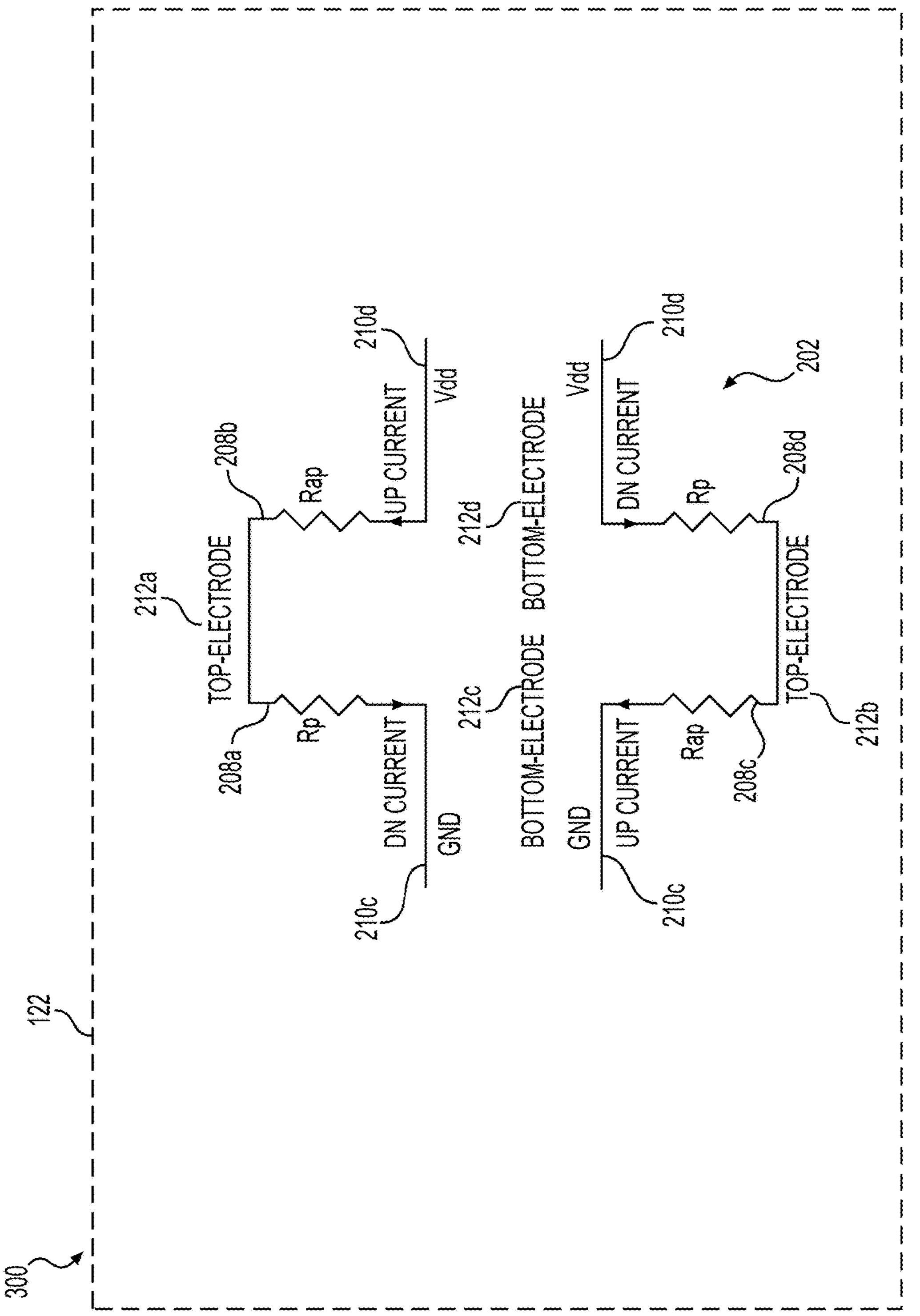
FIG. 3B depicts exemplary circuitry of a multi-time programmable configuration bit configured for writing of a second value, according to an exemplary embodiment of the disclosure.

Turning to FIG. 3B, there is depicted exemplary circuitry 300 of a multi-time programmable configuration bit 122 configured for writing of a second value, according to an exemplary embodiment of the disclosure. The circuitry 300 may include an MTJ bridge 202, a voltage amplifier 204, an inverter 206, resistive elements 208, electrical connections 210, and electrodes 212 (some of which are not illustrated in FIG. 3B for explanatory purposes) configured in a manner similar to the circuitry 200 illustrated in FIG. 2B.

An inverter 206 (not illustrated in FIG. 3B) may be in a second state (e.g., a 1 state) indicative of a second value (e.g., a 1 value) based on a positive Vdd applied to the electrode 212*d* (e.g., a second bot.-elec.) and a GND voltage applied to the electrode 212*c* (e.g., a first bot.-elec.). In this state, based on applying the Vdd and the GND, current may flow from the electrode 212*d* up through the resistive element 208*b* and down through the resistive element 208*d*, through the electrodes 212*a*, 212*b* (e.g., top-electrodes), and down through the resistive element 208*a* and up through the resistive element 208*c* to the electrode 212*c*.

Figure 4A:
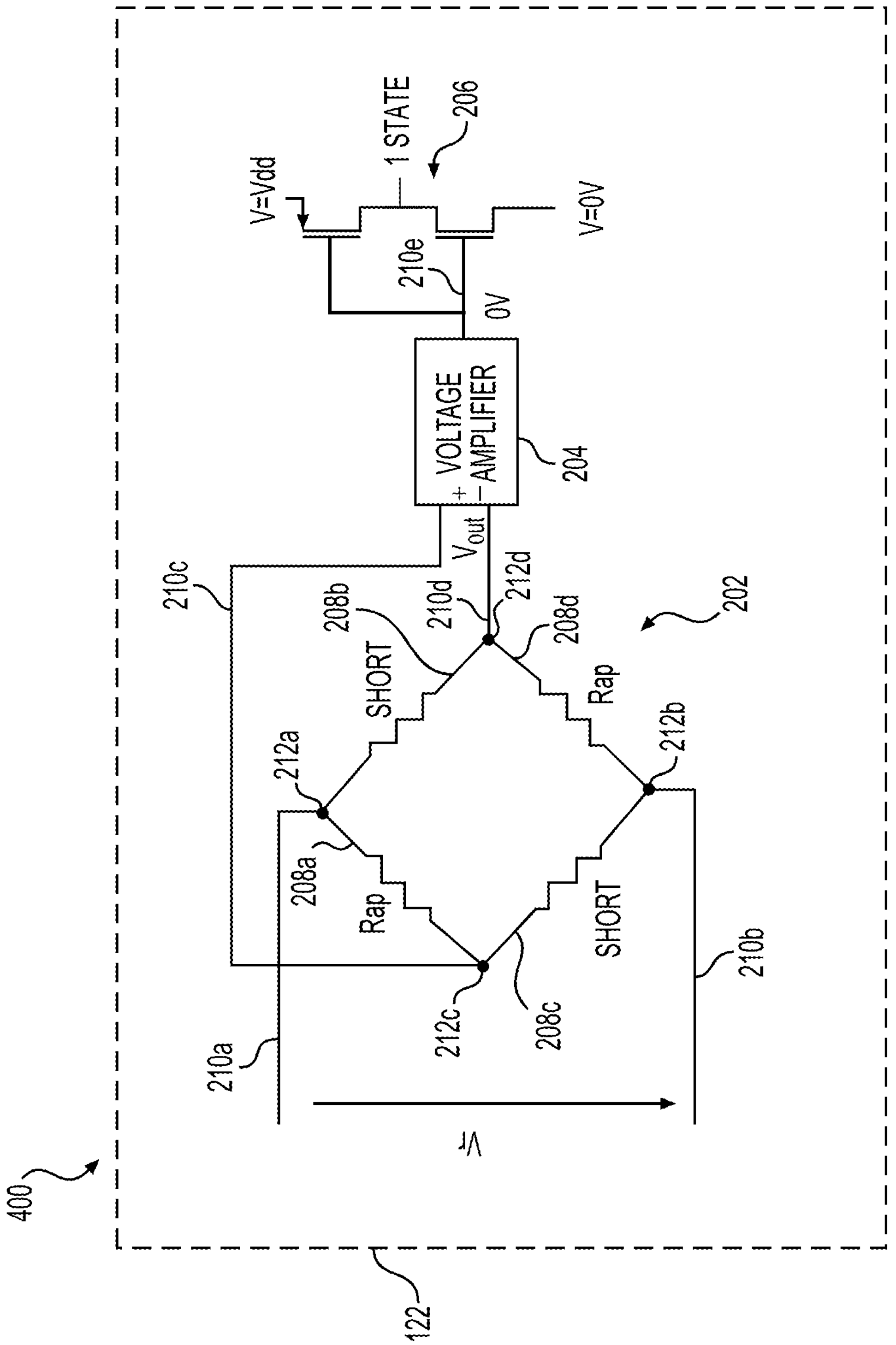
FIG. 4A depicts exemplary circuitry of a one-time programmable configuration bit configured for read-out of a first value, according to an exemplary embodiment of the disclosure.

FIG. 4A depicts exemplary circuitry 400 of a one-time programmable configuration bit 122 configured for read-out of a first value, according to an exemplary embodiment of the disclosure. For example, the configuration bit 122 may not be re-programmable to another value. The circuitry 400 may include an MTJ bridge 202, a voltage amplifier 204, an inverter 206, resistive elements 208, electrical connections 210, and electrodes 212 configured in a manner similar to the circuitry 200 illustrated in FIG. 2A. However, rather than having resistive elements 208*b*, 208*c* in a low or high resistance state, the resistive elements 208*b*, 208*c* may be shorted (identified by "SHORT" in FIG. 4A). The shorting of these resistive elements may cause the inverter 206 to be permanently in a first state (e.g., a 1 state) indicative of a first value (e.g., a 1 value).

Figure 4B:
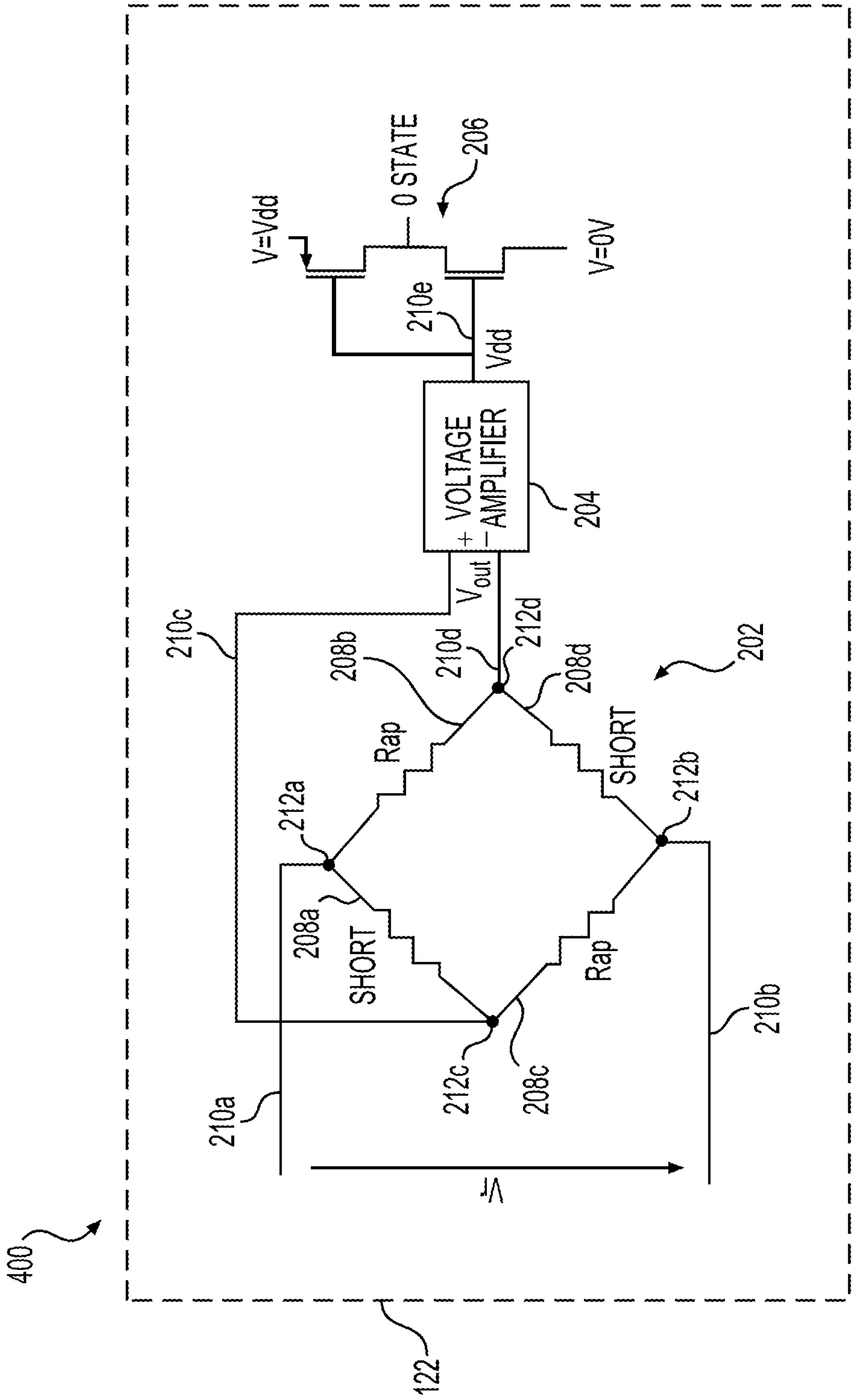
FIG. 4B depicts exemplary circuitry of a one-time programmable configuration bit configured for read-out of a second value, according to an exemplary embodiment of the disclosure.

Turning to FIG. 4B, there is depicted exemplary circuitry 400 of a one-time programmable configuration bit 122 configured for read-out of a second value, according to an exemplary embodiment of the disclosure. For example, the configuration bit 122 may not be re-programmable to another value. The circuitry 400 may include an MTJ bridge 202, a voltage amplifier 204, an inverter 206, resistive elements 208, electrical connections 210, and electrodes 212 configured in a manner similar to the circuitry 200 illustrated in FIG. 2B. However, rather than having resistive elements 208*a* and 208*d* in a low or high resistance state, the resistive elements 208*a* and 208*d* may be shorted. The shorting of these resistive elements 208 may cause the inverter 206 to be permanently in a second state (e.g., a 0 state) indicative of a second value (e.g., a 0 value).

Figure 5:
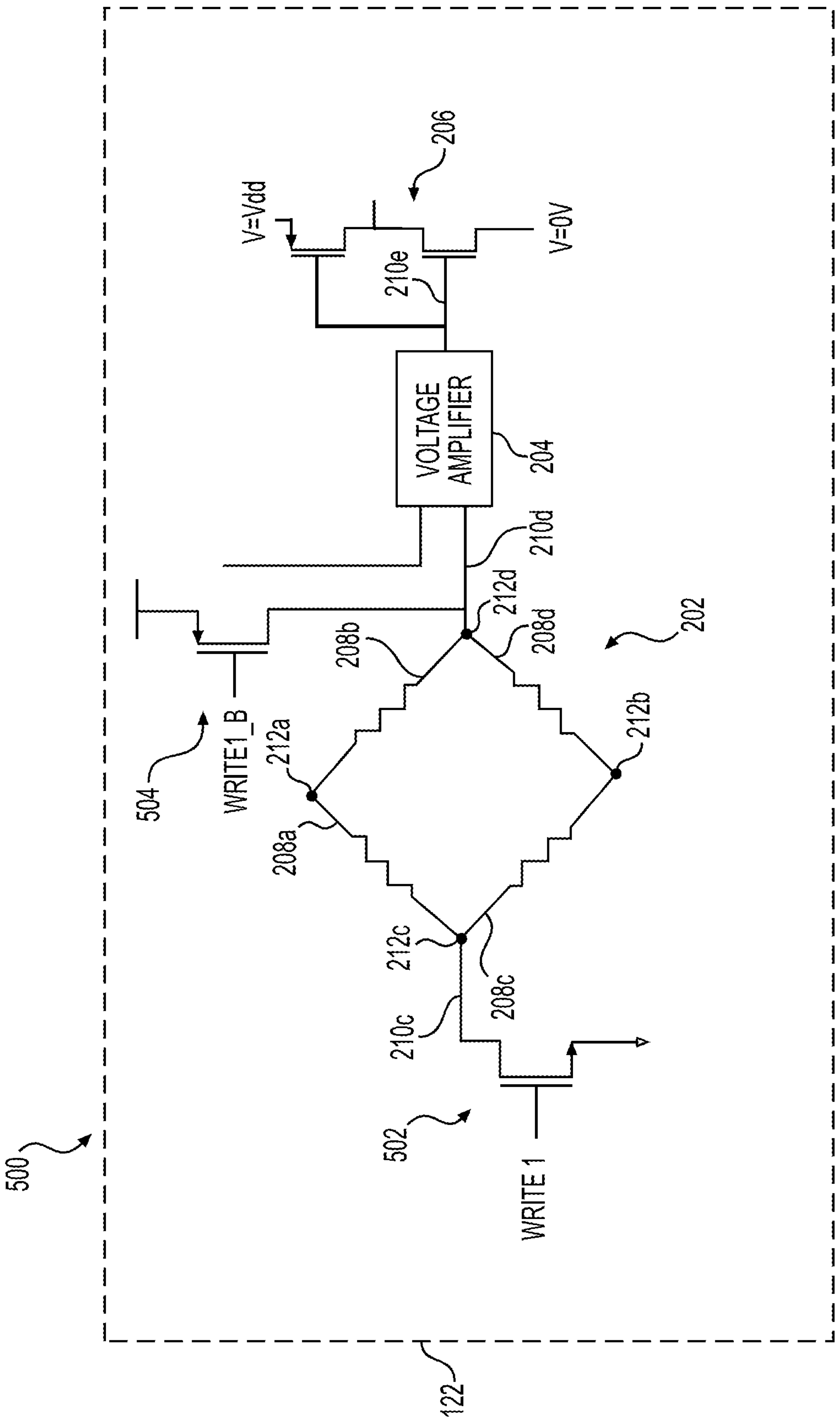
FIG. 5 depicts exemplary circuitry of a multi-time programmable configuration bit configured for writing of a second value, according to an exemplary embodiment of the disclosure.

FIG. 5 depicts exemplary circuitry 500 of a multi-time programmable configuration bit 122 configured for writing of the second value described herein, according to an exemplary embodiment of the disclosure. The circuitry 500 may include an MTJ bridge 202, a voltage amplifier 204, an inverter 206, resistive elements 208, electrical connections 210, and electrodes 212 similar to that described elsewhere herein. The circuitry 500 may further include connections to GND circuitry 502 (that includes a transistor such as a NMOS) and connections to Vdd supply circuitry 504 (that includes a transistor such as a PMOS). With the circuitry 500, writing of the second value described herein (e.g., the 1 value) may be performed by connecting the electrodes 212*c*, 212*d* to the GND circuitry 502 and Vdd supply circuitry 504, respectively. In this configuration, no write bias regulation may be needed. While not shown in FIG. 5, connections to GND circuitry 502 and connections to Vdd circuitry 504 may have multiple transistors and inverters to provide timing control of write voltages.

Figure 6:
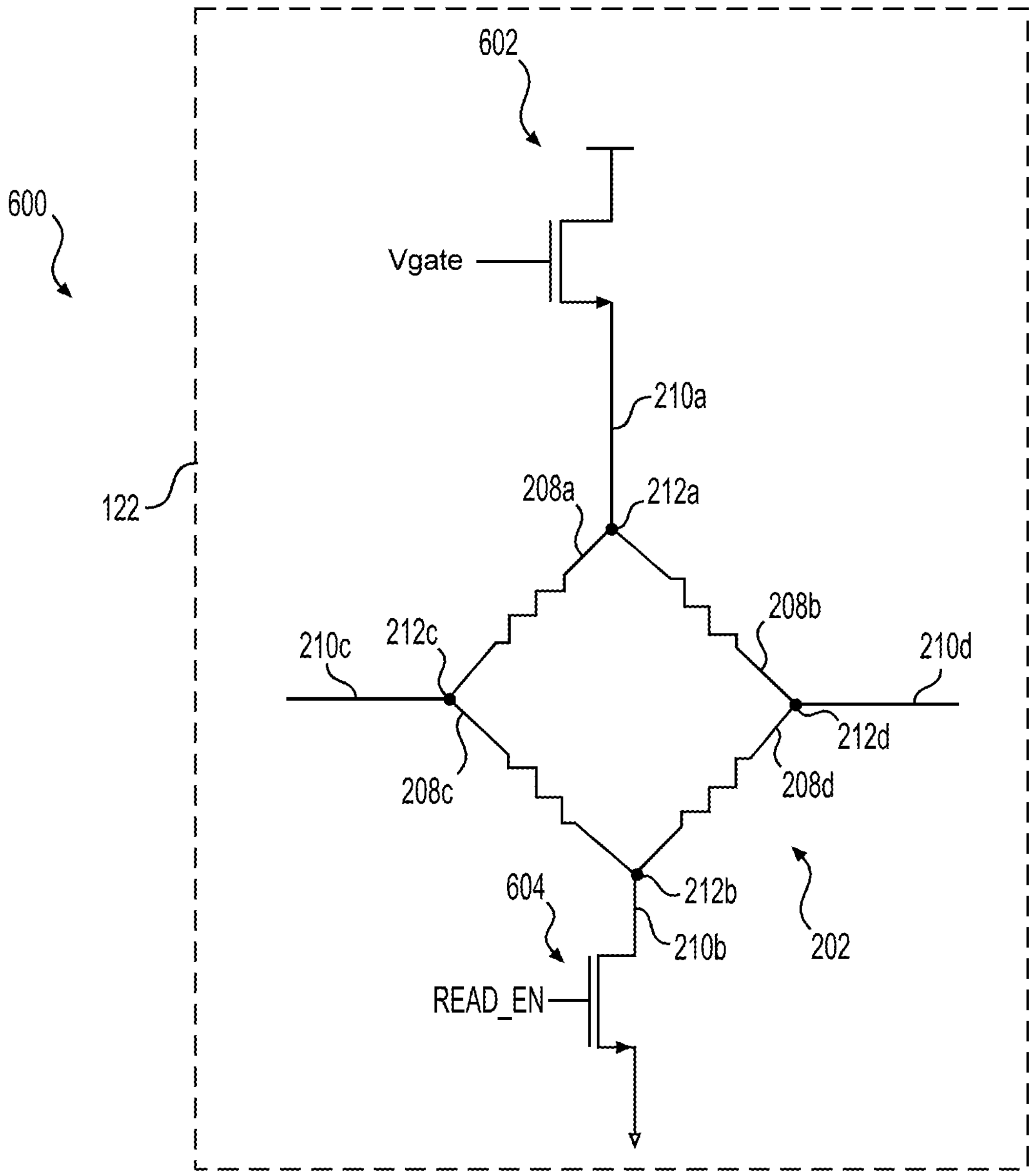
FIG. 6 depicts exemplary circuitry of a programmable configuration bit configured for read-out of a value, according to an exemplary embodiment of the disclosure.

FIG. 6 depicts exemplary circuitry 600 of a programmable configuration bit 122 configured for read-out of a value, according to an exemplary embodiment of the disclosure. The circuitry 600 may include an MTJ bridge 202, a voltage amplifier 204, an inverter 206, resistive elements 208, electrical connections 210, and electrodes 212 (some of which are not illustrated in FIG. 6 for explanatory purposes) similar to that described elsewhere herein. The circuitry 600 may further include gate voltage ("Vgate") circuitry 602 that includes a diode connected transistor drop to step down from the Vgate. Vgate can be any generated voltage desired for read or Vgate can be the supply voltage, such as Vdd. In addition, the circuitry 600 may include GND circuitry 604 that includes a transistor, such as a NMOS. The circuitry 604 may include timing control circuitry with reading enabled (read_en), which can be used to save static current draw. When read is enabled, the MTJ bridge 202 may have static current and may be used for reading using the voltage amplifier 204. In this configuration, no read bias circuitry may be needed. While not shown in FIG. 6, other transistors and inverters can be used in Vdd supply circuitry 602 and GND circuitry 604 to precisely control the timing of the read operation.

Figure 7A:
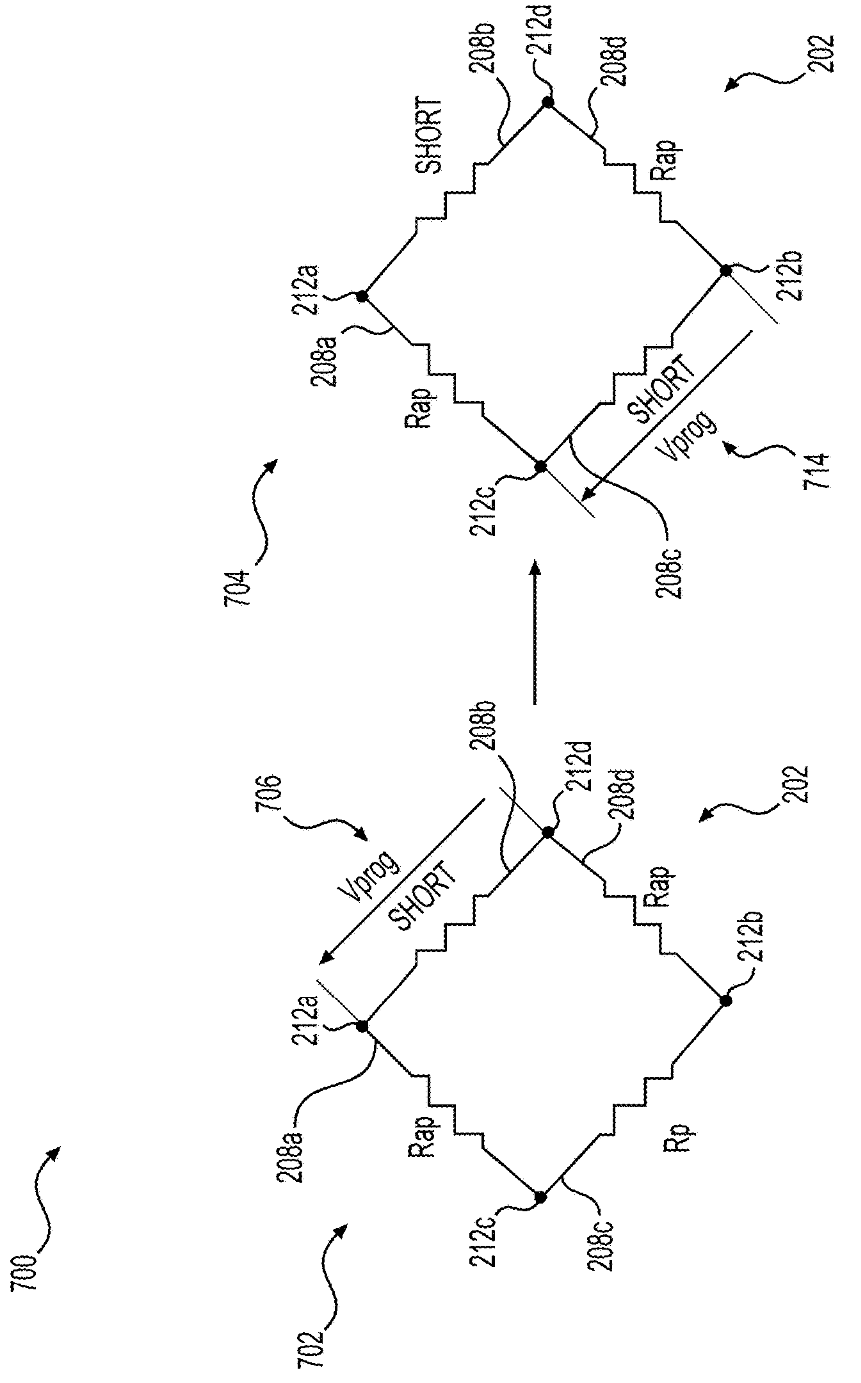
FIG. 7A depicts an exemplary one-time programming of circuitry of a configuration bit with a first value, according to an exemplary embodiment of the disclosure.

FIG. 7A depicts an exemplary one-time programming 700 of circuitry of a configuration bit 122 with a first value, according to an exemplary embodiment of the disclosure. The circuitry may include an MTJ bridge 202, a voltage amplifier 204, an inverter 206, resistive elements 208, electrical connections 210, and electrodes 212 (some of which are not illustrated in FIG. 7A for explanatory purposes) similar to that described elsewhere herein. The resistive elements 208*a*, 208*b* may form a first group of resistive elements 208 and the resistive elements 208*c*, 208*d* may form a second group of resistive elements 208.

The programming may include two steps 702, 704 to configure the circuitry in the manner similar to that described above in connection with the circuitry 400 of FIG. 4A. The first step 702 may include applying various voltages across the resistive elements 208 (e.g., at the same time or at different times). For example, a relatively high (compared to Vdd) programming voltage (Vprog) 706 may be applied across the resistive element 208*b* (one of the first group of resistive elements 208) to short the resistive element 208*b*. In this way, a positive voltage may be applied across the resistive element 208*b* from the electrode 212*d* to the electrode 212*a* to program the configuration bit 122 with the first value.

The second step 704 may include applying various voltages across the resistive elements 208 (e.g., at the same time or at different times). For example, a relatively high (compared to Vdd) programming voltage (Vprog) 714 may be applied across the resistive element 208*c* (the one of the second group of resistive elements 208) to short the resistive element 208*c*. In this way, a positive voltage may be applied across the resistive element 208*c* from the electrode 212*b* to the electrode 212*c* to program the configuration bit 122 with the first value.

Figure 7B:
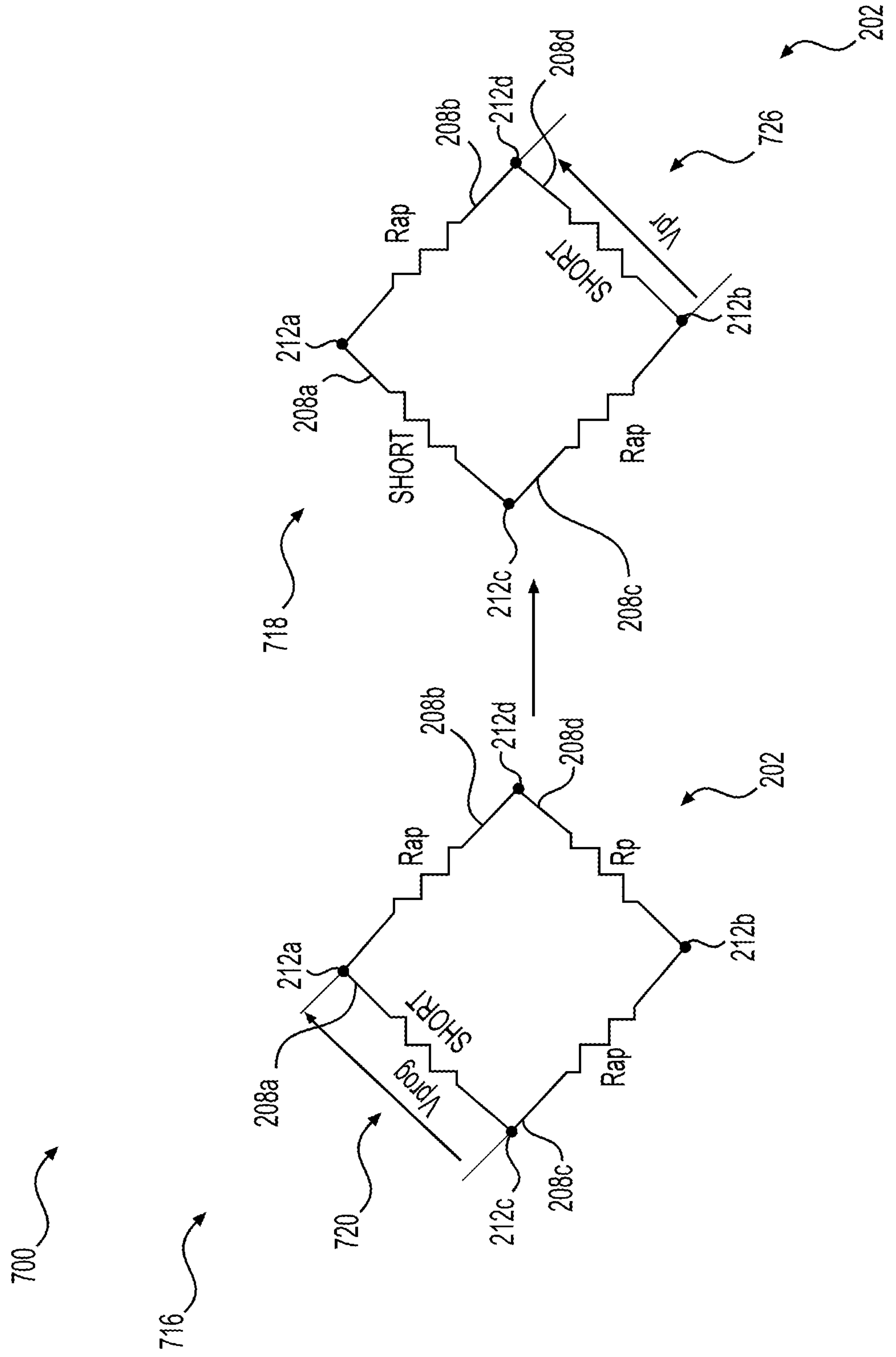
FIG. 7B depicts an exemplary one-time programming of circuitry of a configuration bit with a second value, according to an exemplary embodiment of the disclosure.

Turning to FIG. 7B, there is depicted an exemplary one-time programming 700 of circuitry of a configuration bit 122 with a second value, according to an exemplary embodiment of the disclosure. The circuitry may include an MTJ bridge 202, a voltage amplifier 204, an inverter 206, resistive elements 208, electrical connections 210, and electrodes 212 (some of which are not illustrated in FIG. 7B for explanatory purposes) similar to that described elsewhere herein. The resistive elements 208*a*, 208*b* may form a first group of resistive elements 208 and the resistive elements 208*c*, 208*d* may form a second group of resistive elements 208.

The programming may include two steps 716, 718 to configure the circuitry in the manner similar to that described above in connection with the circuitry 400 of FIG. 4B. The first step 716 may include applying various voltages across the resistive elements 208 (e.g., at the same time or at different times). For example, a relatively high Vprog 720 may be applied across the resistive element 208*a* (one of the first group of resistive elements 208) to short the resistive element 208*a*. In this way, a positive voltage may be applied across the resistive element 208*a* from the electrode 212*c* to the electrode 212*a* to program the configuration bit 122 with the second value.

The second step 718 may include applying various voltages across the resistive elements 208 (e.g., at the same time or at different times). For example, a relatively high Vprog 726 may be applied across the resistive element 208*d* (the one of the second group of resistive elements 208) to short the resistive element 208*d*. In this way, a positive voltage may be applied across the resistive element 208*d* from the electrode 212*b* to the electrode 212*d* to program the configuration bit 122 with the second value.

Figure 8:
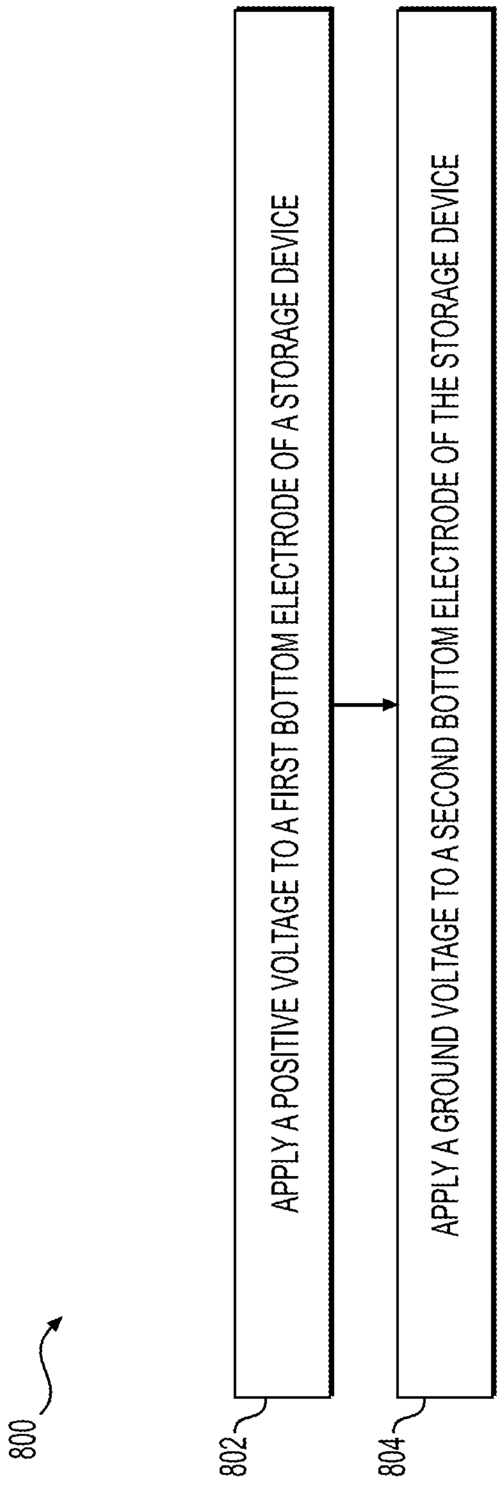
FIG. 8 depicts a flowchart for an exemplary method for multi-time programming of a configuration bit with a value, according to an aspect of the present disclosure.

FIG. 8 depicts a flowchart for an exemplary method 800 for multi-time programming of a configuration bit 122 with a value, according to an aspect of the present disclosure. For example, the method 800 may program the configuration bit 122 in the manner illustrated in, and described in connection with, FIGS. 3A and/or 3B.

In step 802, the method 800 may include applying a positive voltage to a first bottom electrode of a configuration bit (e.g., configuration bit 122). For example, to program the configuration bit 122 with a first value for a first state (e.g., a 0 value for a 0 state) in a manner similar to that illustrated in FIG. 3A, the step 802 may include applying the positive voltage to the electrode 212*c* between the resistive elements 208*a*, 208*c*. Alternatively, to program the configuration bit 122 with a second value for a second state (e.g., a 1 value for a 1 state) in a manner similar to that illustrated in FIG. 3B, the step 802 may include applying the positive voltage to the electrode 212*d* between the resistive elements 208*b*, 208*d*.

In step 804, the method 800 may include applying a ground (GND) voltage to a second bottom electrode of the configuration bit (e.g., configuration bit 122). For example, to program the configuration bit 122 with the first value for the first state in a manner similar to that illustrated in FIG. 3A, the step 804 may include applying the GND voltage to the electrode 212*d* between the resistive elements 208*b*, 208*d*. Alternatively, to program the configuration bit 122 with the second value for the second state in a manner similar to that illustrated in FIG. 3B, the step 804 may include applying the GND voltage to the electrode 212*c* between the resistive elements 208*a*, 208*c*.

Figure 9:
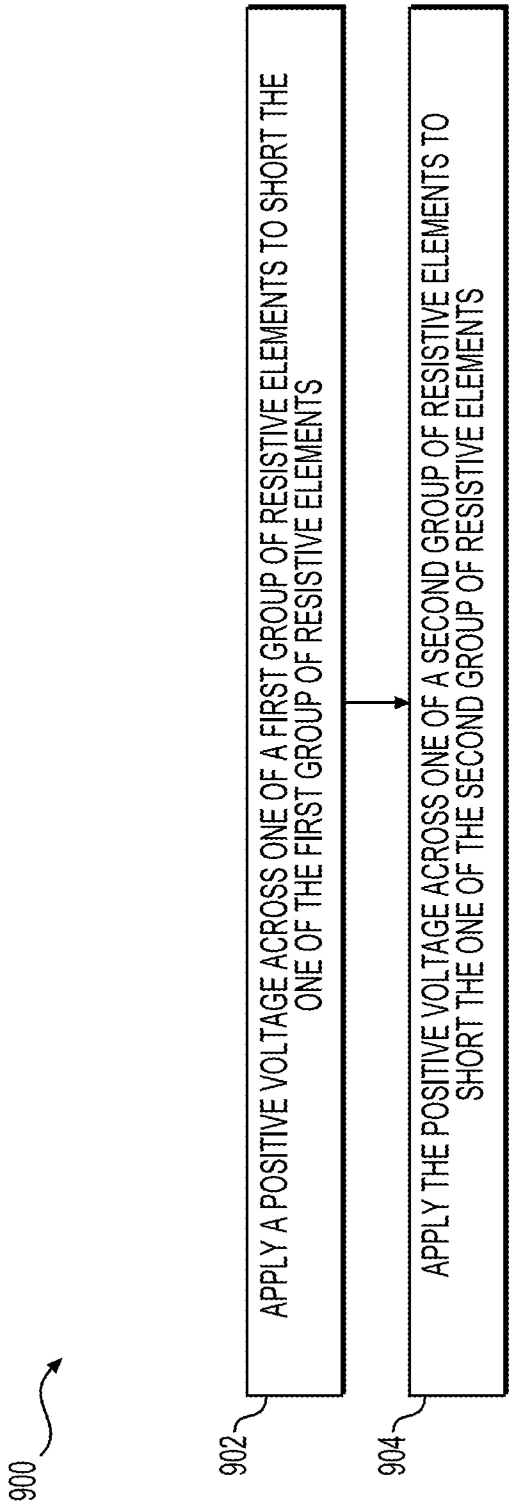
FIG. 9 depicts a flowchart for an exemplary method for one-time programming of a configuration bit with a value, according to an aspect of the present disclosure.

FIG. 9 depicts a flowchart for an exemplary method 900 for one-time programming of a configuration bit 122 with a value, according to an aspect of the present disclosure. For example, the method 900 may program the configuration bit 122 in the manner illustrated in, and described in connection with, FIGS. 7A and/or 7B.

In the step 902, the method 900 may include applying a positive voltage across one of a first group of resistive elements (e.g., a first group of resistive elements 208) to short the one of the first group of resistive elements. For example, the first group of resistive elements 208 may include the resistive elements 208*a*, 208*b* and the step 902 may include applying the positive voltage, to program the configuration bit 122 with a first value (e.g., a 0 value), across the resistive element 208*b* from the electrode 212*d* to the electrode 212*a*. In this example, the resistive element 208*b* may be in a low resistance state and the resistive element 208*a* may be in a high resistance state. Alternatively, the step 902 may include applying the positive voltage, to program the configuration bit 122 with a second value (e.g., a 1 value), across the resistive element 208*a* from the electrode 212*c* to the electrode 212*a*. In this example, the resistive element 208*a* may be in a low resistance state and the resistive element 208*b* may be in a high resistance state.

The step 904 may include applying the positive voltage across one of a second group of resistive elements (e.g., a second group of resistive elements 208) to short the one of the second group of resistive elements. For example, the second group of resistive elements 208 may include the resistive elements 208*c*, 208*d* and the step 902 may include applying the positive voltage, to program the configuration bit 122 with the first value, across the resistive element 208*c* from the electrode 212*b* to the electrode 212*c*. In this example, the resistive element 208*c* may be in a low resistance state and the resistive element 208*d* may be in a high resistance state. Alternatively, the step 904 may include applying the positive voltage, to program the configuration bit 122 with the second value, across the resistive element 208*d* from the electrode 212*b* to the electrode 212*d*. In this example, the resistive element 208*d* may be in a low resistance state and the resistive element 208*c* may be in a high resistance state.

Certain embodiments described herein may include additional or alternative aspects. As one example aspect, writing of a value to a configuration bit 122 may include using a write-verify technique. As another example aspect, a resistive element 208 may include a high resistance area MTJ in order to use Vdd for writing.

As another example aspect, digital control input for read and write operations may be provided by direct routing of each control signal or by using a scan-chain register. Bits in a scan-chain register may provide different control signals in that aspect.

In this way, certain embodiments described herein may provide for multi-time programming or one-time programming of a configuration bit 122 with a value. This programming may be performed without communication with a storage device external to an FPGA architecture 100. This may improve security and/or reduce the amount of circuitry needed for implementing the configuration bit 122 relative to conventional techniques. For example, certain embodiments may simplify peripheral circuitry by eliminating a need for a sense amplifier or a write driver. In addition, by using an MTJ bridge 202, certain embodiments may provide compact circuitry for non-volatile memory, which may conserve chip space relative to conventional techniques of implementing non-volatile memory in the FPGA architecture 100 (e.g., Flash-based memory). This may allow for scalability of on-chip non-volatile memory to smaller manufacturing scales than conventional techniques.

In one embodiment, a configuration bit may comprise at least four resistive elements, wherein at least two first resistive elements are electrically connected in series via a first electrode and at least two second resistive elements are electrically connected in series via a second electrode, wherein the at least two first resistive elements are electrically connected in parallel to the at least two second resistive elements via a third electrode and a fourth electrode; and a voltage amplifier, wherein the first electrode and the second electrode are electrically connected to a voltage supply, and wherein the third electrode and the fourth electrode are electrically connected to an input of the voltage amplifier.

Various embodiments of the configuration bit may include: the configuration bit further comprising an inverter electrically connected to an output of the voltage amplifier, wherein the inverter is in a state indicative of a value based on: a positive voltage input to the first electrode and the second electrode from the voltage supply, a negative voltage output from the third electrode and the fourth electrode to the voltage amplifier, a voltage output from the voltage amplifier equal to zero voltage, and higher resistance resistive elements between the first electrode and the third electrode and between the second electrode and the fourth electrode than between the first electrode and the fourth electrode and between the second electrode and the third electrode; the configuration bit further comprising an inverter electrically connected to an output of the voltage amplifier, wherein the inverter is in a state indicative of a value based on: a positive voltage input to the first electrode and the second electrode from the voltage supply wherein the positive voltage is lower than a switching voltage for a resistive element for read operation, a positive voltage output from the third electrode and the fourth electrode to the voltage amplifier, a voltage output from the voltage amplifier equal to a positive drain voltage, and lower resistance resistive elements between the first electrode and the third electrode and between the second electrode and the fourth electrode than between the first electrode and the fourth electrode and between the second electrode and the third electrode; the configuration bit further comprising an inverter electrically connected to an output of the voltage amplifier, wherein the inverter is in a state indicative of a value based on: a positive voltage input to the first electrode and the second electrode from the voltage supply, a negative voltage output from the third electrode and the fourth electrode to the voltage amplifier, a voltage output from the voltage amplifier equal to zero voltage, and shorted resistive elements between the first electrode and the fourth electrode and between the second electrode and the third electrode; the configuration bit further comprising an inverter electrically connected to an output of the voltage amplifier, wherein the inverter is in a state indicative of a value based on: a positive voltage input to the first electrode and the second electrode from the voltage supply, a positive voltage output from the third electrode and the fourth electrode to the voltage amplifier, a voltage output from the voltage amplifier equal to a positive drain voltage, and shorted resistive elements between the first electrode and the third electrode and between the second electrode and the fourth electrode; wherein each of the four resistive elements comprises a magnetic tunnel junction (MTJ); wherein the configuration bit comprises a magnetoresistive random-access memory (MRAM) or a resistive random-access memory (ReRAM); wherein the configuration bit is included in a field-programmable gate array (FPGA); and wherein the first electrode is electrically connected to the voltage supply via a diode and the second electrode is electrically connected to a ground voltage.

In another embodiment, a method for programming a configuration bit may comprise: applying a positive voltage to a first bottom electrode of the configuration bit wherein the positive voltage is higher than a switching voltage for a resistive element and is lower than a breakdown voltage for the resistive element; and applying a ground voltage to a second bottom electrode of the configuration bit, wherein the configuration bit comprises a first top electrode between a first resistive element and a second resistive element and a second top electrode between a third resistive element and a fourth resistive element, and wherein one of the first resistive element and the second resistive element has a higher resistivity than the other of the first resistive element and the second resistive element and wherein one of the third resistive element and the fourth resistive element has a higher resistivity than the other of the third resistive element and the fourth resistive element.

Various embodiments of the method for programming the configuration bit may include: wherein the first resistive element has the higher resistivity than the second resistive element and the fourth resistive element has the higher resistivity than the third resistive element to program the configuration bit with a value, wherein the applying of the positive voltage further comprises applying the positive voltage to the first bottom electrode between the first resistive element and the third resistive element, and wherein the applying of the ground voltage further comprises applying the ground voltage to the second bottom electrode between the second resistive element and the fourth resistive element; wherein, based on the applying of the positive voltage and the ground voltage, current flows from the first bottom electrode up through the first resistive element and down through the third resistive element, through the first top electrode and the second top electrode, and down through the second resistive element and up through the fourth resistive element to the second bottom electrode; wherein the second resistive element has the higher resistivity than the first resistive element and the third resistive element has the higher resistivity than the fourth resistive element to program the configuration bit with a value, wherein the applying of the positive voltage further comprises applying the positive voltage to the second bottom electrode between the second resistive element and the fourth resistive element, and wherein the applying of the ground voltage further comprises applying the ground voltage to the first bottom electrode between the first resistive element and the third resistive element; and wherein, based on the applying of the positive voltage and the ground voltage, current flows from the second bottom electrode up through the second resistive element and down through the fourth resistive element, through the first top electrode and the second top electrode, and down through the first resistive element and up through the third resistive element to the first bottom electrode.

In another embodiment, a method for programming a configuration bit comprising a first group of resistive elements including a first resistive element and a second resistive element and comprising a second group of resistive elements including a third resistive element and a fourth resistive element, the method comprising: applying a positive voltage across one of the first group of resistive elements to short the one of the first group of resistive elements, wherein the first group of resistive elements are electrically connected in series via a first electrode; and applying the positive voltage across one of the second group of resistive elements to short the one of the second group of resistive elements, wherein the second group of resistive elements are electrically connected in series via a second electrode, wherein the first group of resistive elements and the second group of resistive elements are electrically connected in parallel via a third electrode and a fourth electrode.

Various embodiments of the method for programming the configuration bit comprising the first group of resistive elements including the first resistive element and the second resistive element and comprising the second group of resistive elements including the third resistive element and the fourth resistive element may include: wherein the applying of the positive voltage across the one of the first group of resistive elements further comprises applying the positive voltage, to program the configuration bit with a value, across the second resistive element from the fourth electrode to the first electrode; wherein the applying of the positive voltage across the one of the second group of resistive elements further comprises applying the positive voltage, to program the configuration bit with the value, across the third resistive element from the second electrode to the third electrode; wherein the applying of the positive voltage across the one of the first group of resistive elements further comprises applying the positive voltage, to program the configuration bit with a value, across the first resistive element from the third electrode to the first electrode; wherein the applying of the positive voltage across the one of the second group of resistive elements further comprises applying the positive voltage, to program the configuration bit with the value, across the fourth resistive element from the second electrode to the fourth electrode; and wherein the configuration bit is included in a field-programmable gate array (FPGA).

The foregoing description of the inventions has been described for purposes of clarity and understanding. It is not intended to limit the inventions to the precise form disclosed. Various modifications may be possible within the scope and equivalence of the application.

We claim:

1. A configuration bit, comprising:

a voltage supply;

a first electrode electrically connected to the voltage supply;

a second electrode electrically connected to the voltage supply;

a first group of resistive elements, wherein at least two resistive elements of the first group of resistive elements are electrically connected in series via the first electrode;

a second group of resistive elements, wherein at least two resistive elements of the second group of resistive elements are electrically connected in series via the second electrode, wherein at least one resistive element of the first or second groups of resistive elements is configured to be shorted;

a voltage amplifier electrically connected to the first and second groups of resistive elements; and a latch electrically connected to an output of the voltage amplifier.

2. The configuration bit of claim 1, further comprising an inverter electrically connected to the output of the voltage amplifier.

3. The configuration bit of claim 1, wherein at least one resistive element of the first group of resistive elements is arranged in parallel with at least one resistive element of the second group of resistive elements.

4. The configuration bit of claim 1, wherein the at least two resistive elements of the first group of resistive elements are electrically connected in parallel to the at least two resistive elements of the second group of resistive elements via a third electrode and a fourth electrode.

5. The configuration bit of claim 1, wherein at least one resistive element of the first group of resistive elements and at least one resistive element of the second group of resistive elements are configured to be shorted.

6. The configuration bit of claim 1, wherein each of the resistive elements of the first and second groups of resistive elements comprises a magnetic tunnel junction (MTJ).

7. The configuration bit of claim 1, wherein the first group of resistive elements includes at least four resistive elements, and wherein the second group of resistive elements includes at least four resistive elements.

8. The configuration bit of claim 1, wherein the configuration bit comprises a magnetoresistive random-access memory (MRAM) or a resistive random-access memory (ReRAM).

9. A configuration bit, comprising:

a first group of resistive elements, wherein at least two resistive elements of the first group of resistive elements are electrically connected in series via a first electrode;

a second group of resistive elements, wherein at least two resistive elements of the second group of resistive elements are electrically connected in series via a second electrode opposite the first electrode, wherein at least one resistive element of the first or second groups of resistive elements is configured to be shorted;

a voltage amplifier electrically connected to the first and second groups of resistive elements; and a latch electrically connected to an output of the voltage amplifier.

10. The configuration bit of claim 9, further comprising an inverter electrically connected to the output of the voltage amplifier.

11. The configuration bit of claim 9, wherein one or more resistive elements of the first group of resistive elements are arranged in parallel with one or more resistive elements of the second group of resistive elements.

12. The configuration bit of claim 9, further comprising a third electrode and a fourth electrode opposite the third electrode.

13. The configuration bit of claim 9, wherein the at least two resistive elements of the first group of resistive elements are electrically connected in parallel to the at least two resistive elements of the second group of resistive elements via a third electrode and a fourth electrode.

14. The configuration bit of claim 9, wherein at least one resistive element of the first group of resistive elements and at least one resistive element of the second group of resistive elements are configured to be shorted.

15. The configuration bit of claim 9, wherein each of the resistive elements of the first and second groups of resistive elements comprises a magnetic tunnel junction (MTJ).

16. The configuration bit of claim 9, wherein the first group of resistive elements includes at least four resistive elements, and wherein the second group of resistive elements includes at least four resistive elements.

17. The configuration bit of claim 9, wherein the configuration bit comprises a magnetoresistive random-access memory (MRAM) or a resistive random-access memory (ReRAM).

18. A configuration bit, comprising:

a first group of resistive elements that includes at least four resistive elements, wherein at least two resistive elements of the first group of resistive elements are electrically connected in series via a first electrode;

a second group of resistive elements that includes at least four resistive elements, wherein at least two resistive elements of the second group of resistive elements are electrically connected in series via a second electrode, wherein the resistive elements of the first group of resistive elements are electrically connected in parallel to the resistive elements of the second group of resistive elements via a third electrode and a fourth electrode, wherein at least one resistive element from one or both of the first group of resistive elements or the second group of resistive elements is configured to be shorted;

a voltage amplifier;

a latch electrically connected to an output of the voltage amplifier; and a voltage supply electrically connected to the first electrode and the second electrode.

19. The configuration bit of claim 18, further comprising an inverter is electrically connected to the output of the voltage amplifier.

20. The configuration bit of claim 18, wherein at least one resistive element of the first group of resistive elements and at least one resistive element of the second group of resistive elements are configured to be shorted.

* * * * *